United States Patent [19]
Dickison et al.

[11] Patent Number: 5,788,300
[45] Date of Patent: Aug. 4, 1998

[54] GRAPPLE APPARATUS FOR LIFTING BALLED TREES

[75] Inventors: Kenneth Dickison, Oakville; John Kesteloot, Waterloo, both of Canada

[73] Assignee: Otto Timm, Oakville, Canada

[21] Appl. No.: 475,911

[22] Filed: Jun. 7, 1995

[51] Int. Cl.⁶ ...................................................... B66C 1/44
[52] U.S. Cl. ........................ 294/86.41; 294/88; 294/106
[58] Field of Search .......................... 294/67.22, 86.41, 294/88, 105–107, 111, 112, 902; 414/621, 622, 732, 735, 739, 740

[56] References Cited

U.S. PATENT DOCUMENTS

| | | | |
|---|---|---|---|
| 2,683,546 | 7/1954 | Sherriff | 294/88 X |
| 2,904,202 | 9/1959 | Brady | 294/88 X |
| 3,152,706 | 10/1964 | Conrad | 294/88 X |
| 3,165,348 | 1/1965 | Keskitalo | 414/739 X |
| 3,275,173 | 9/1966 | Kampert et al. | 414/739 X |
| 3,451,711 | 6/1969 | Carpenter | 294/106 X |
| 4,242,037 | 12/1980 | Baumgarten | 294/88 X |
| 4,452,479 | 6/1984 | Terai et al. | 294/88 |
| 5,209,536 | 5/1993 | Rogers | 294/88 |
| 5,328,223 | 7/1994 | Maggio | 294/88 X |
| 5,516,174 | 5/1996 | Squyres | 294/88 X |

OTHER PUBLICATIONS

DALLA BONA Brochure (1), no date.
DALLA BONA Brochure (2), no date.
DALLA BONA Brochure (3), no date.

*Primary Examiner*—Johnny D. Cherry
*Attorney, Agent, or Firm*—Bereskin & Parr

[57] ABSTRACT

An apparatus is provided for lifting balled and burlapped trees. The apparatus has a pair of jaws that can open and close, grabbing the earth ball of a tree at its top and bottom. The front jaw has two separate arms with hinged pads at their lower ends adapted to fit on the top of the earth ball of tree, with one on either side of the tree trunk. The rear jaw has a blade extending across it to fit on the bottom of the earth ball. The apparatus is asymmetric in profile to facilitate grasping and maneuvering of a balled tree with its trunk extending at an angle from vertical.

6 Claims, 3 Drawing Sheets

GRAPPLE APPARATUS FOR LIFTING BALLED TREES

FIELD OF THE INVENTION

The present invention relates generally to hydraulic lifting apparatus, particularly nursery farm equipment.

In nursery farm operations, it is common to handle balled and burlapped trees. These are typically young trees, including shrubs and evergreens, that have been grown for several years to be sold for replanting in commercial or residential landscaping. The trees are dug up by hand with shovels, or by using a special automated machine. In either case, the tree remains in a large earth ball that holds the major roots of the tree. The earth ball is wrapped in burlap, and tied or placed in a wire basket. The overall shape of the earth ball is generally somewhat spherical, but typically quite irregular and often approaching an inverted frustoconical shape. Frequently, the branches of the tree are also bound and the trunks are wrapped with a protective cover.

Balled and burlapped trees typically range in height from about 5 to 20 feet, including the earth ball. The earth ball alone typically ranges in height and width from about 18 inches to about 60 inches. The total weight of each balled and burlapped tree can range from about 100 to 1,500 pounds or more, typically in the order of 200 to 1,000 pounds.

Because of their overall size, weight and awkward shape, power equipment is required to lift all but the smallest of balled and burlapped trees.

Generally, in a nursery farm operation, when trees are to be harvested, a large number of trees are dug up and prepared in balled and burlapped fashion. A flat bed truck or trailer is used on which to collect the balled and burlapped trees and transport them to markets or holding areas. A hydraulic boom is either provided on the truck or on a separate crane or front end loader that accompanies the truck to the harvesting site. The hydraulic boom is fitted with chains that can be secured with hooks or a sling around the earth ball of a balled and burlapped tree in order to lift the tree from the ground onto the truck bed.

Typically, a group of trees is transported at the same time, but each tree must be loaded onto the truck bed individually. The trees are oriented so that their trunks are tipped over, approaching horizontal, so that they will be more stable. The trees are arranged on the truck bed in rows, each row including several trees placed immediately adjacent to each other, with their earth balls virtually touching, and their trunks oriented in the same direction, approximately parallel. Each successive row of trees is aligned similarly, the trunks positioned over preceding rows of those trees that have already been placed. This close arrangement of the trees, optimizes utilization of space in shipping and storage.

The harvesting of balled and burlapped trees using chains to lift the trees is quite labour intensive, and there is also a risk of injury. Three workers are generally required to lift the balled and burlapped trees onto the truck bed. One worker is required to manipulate the hydraulic boom. A second worker is required on the ground to secure the chains in place on the earth ball of the tree to be lifted. A third worker is required on the truck bed to help direct the tree, which may be swinging from its chains, and also to remove the chains once the tree has been placed in its position.

Of course, a single worker could perform all three jobs, but this would require the worker continuously to move from work station to work station: from boom controls to ground, back to the boom controls and then up to the truck bed, and so forth. This would be very slow and inefficient.

As well as being labour intensive, harvesting balled and burlapped trees with a chain sling also poses risks of injury to the workers, particularly the worker positioned on the truck bed, who frequently must push or pull the suspended tree to help it be placed in proper position.

It has been proposed to use known grabbing apparatus that can be connected to hydraulic boom arms for lifting and repositioning balled and burlapped trees. Some such apparatus comprise a pair of jaws that can open and close to grab and hold items which can then be lifted, repositioned and released. However, known apparatus, for example log grabs, can only be used to grab the sides of the earth ball of a balled and burlapped tree. Thus, with such an apparatus, balled and burlapped trees can not be positioned in rows immediately adjacent to each other with their earth balls virtually touching, because the jaws of the apparatus require space between the earth balls by which they can be released and removed away from the trees.

It is an object of the present invention to obviate or mitigate the disadvantages of known methods and apparatus for lifting and repositioning balled and burlapped trees.

SUMMARY OF THE INVENTION

In accordance with a first aspect of the present invention there is provided an apparatus for lifting a balled and burlapped tree. The apparatus comprises a pair of jaws that are pivotally linked to a coupling having mounting means adapted to be mounted to a hydraulic boom, the jaws being pivotally connected to open and close through a range of dimensions adapted to grab the earth ball of a balled and burlapped tree. One of the jaws has two separate arms that are adapted to fit on the top of the earth ball such that one of the arms is on either side of the trunk of the tree, each of the arms having at its end a pad that is hingedly connected to the arm. The second jaw of the apparatus has at its end a transverse support adapted to fit on the bottom of the earth ball of the tree. Most preferably, the pads include a resiliently compressible contact surface. The apparatus is asymmetric in profile with the jaws configured such that in use, with the apparatus mounted to such a boom in a generally horizontal orientation, a vertical plane through the centre of the mounting means parallel to the front and rear jaw assemblies is farther from the transverse support of the rear jaw assembly than from the contact surfaces of the front jaw assembly. As a result, when the apparatus is used for lifting a balled tree, the centre of the earth ball of such a balled tree held by the jaw assemblies also aligns vertically rearward of the mounting means. The centre of gravity of the tree is thus more closely aligned vertically with the mounting means when the tree is held with its trunk extending forwardly at an angle from vertical, which facilitates maneuvering and close placement of the tree in an aligned row of other trees.

Advantageously, the two jaws are hingedly connected to either end of a yoke having a dimension similar to the earth ball of the tree. More advantageously, the jaws are both curved and are oriented with their curves facing the same direction. Most advantageously, the apparatus further comprises a hydraulic cylinder and piston extending between the pair of jaws which is adapted to open and close the jaws when the cylinder and piston extend and contract.

In use in lifting a balled and burlapped tree, the apparatus is connected to a hydraulic boom, preferably with a connection that permits continuous turning.

According to a second aspect of the present invention, there is provided a method for lifting and repositioning a balled and burlapped tree. The method comprises the following steps: first, orienting the tree with its trunk at an angle from vertical; then providing a hydraulic boom mounted lifting apparatus comprising a pair of jaws that are pivotally connected to open and close; then positioning the lifting apparatus above the tree so that it is in alignment with a vertical plane passing through the trunk of the tree, with the jaws being opened wider than the height of the earth ball of the tree; then lowering the lifting apparatus over the earth ball of the tree; then closing the jaws of the lifting apparatus to gently squeeze the earth ball of the tree, with one of the jaws contacting the top of the earth ball proximal to the trunk of the tree, and the other jaw contacting the bottom of the earth ball opposed to the trunk of the tree; then grasping and lifting the tree and repositioning it; and finally, opening the jaws to release the earth ball of the tree, and raising the lifting apparatus away from the tree.

It has been found that the present invention provides a highly effective method and apparatus by which a single worker can lift and reposition balled and burlapped trees for transport and storage, arranging the trees side by side in rows, with the trees in each row being immediately adjacent to each other, the earth balls of adjacent trees virtually touching.

BRIEF DESCRIPTION OF THE DRAWINGS

In order that the invention may be more clearly understood, reference with now be made to the accompanying drawings in which.

DESCRIPTION OF THE PREFERRED EMBODIMENT

Figure 1:
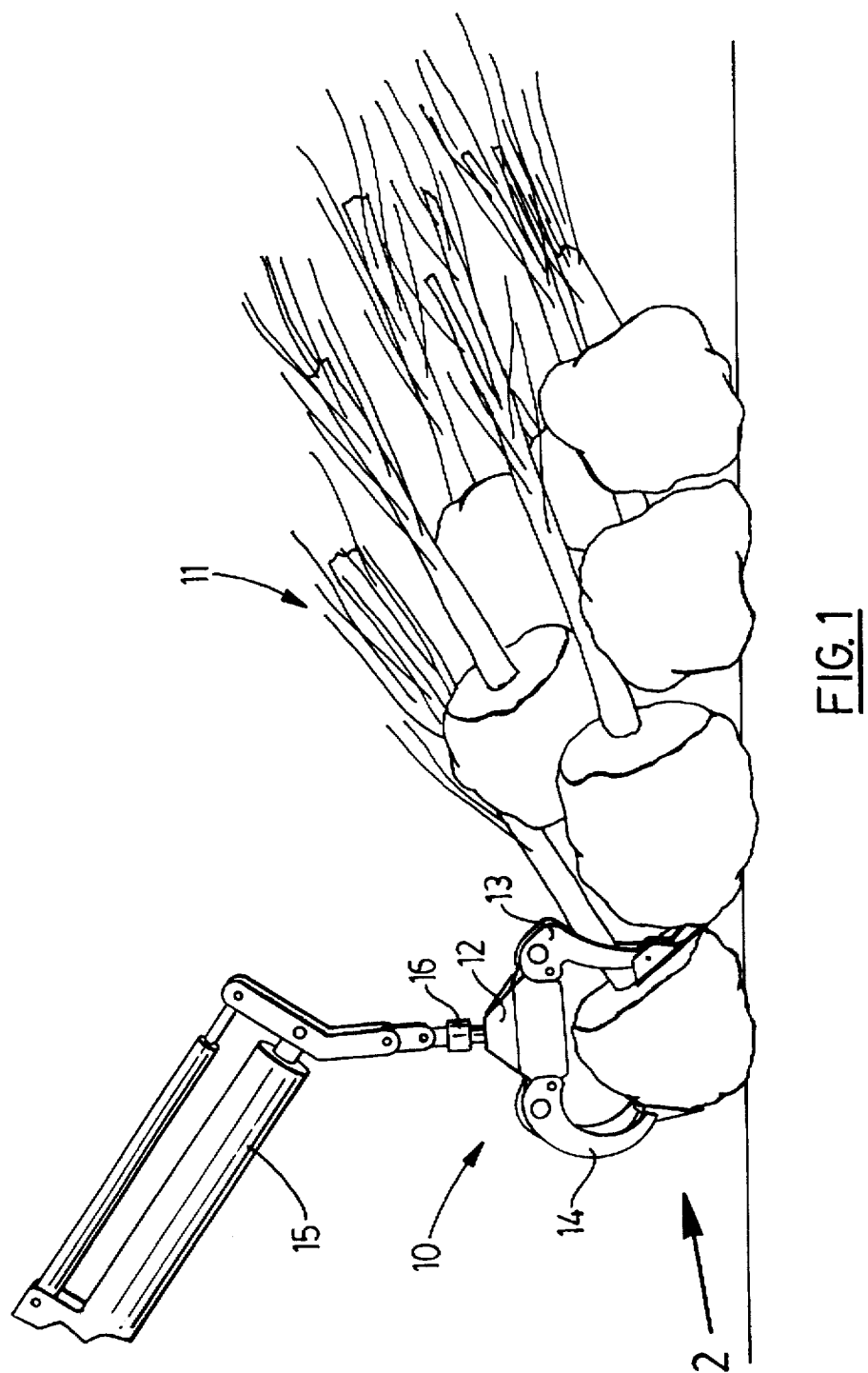
FIG. 1 is a side view of a preferred embodiment of an apparatus for lifting balled and burlapped trees according to the present invention, shown in use with a tree.
Figure 3:
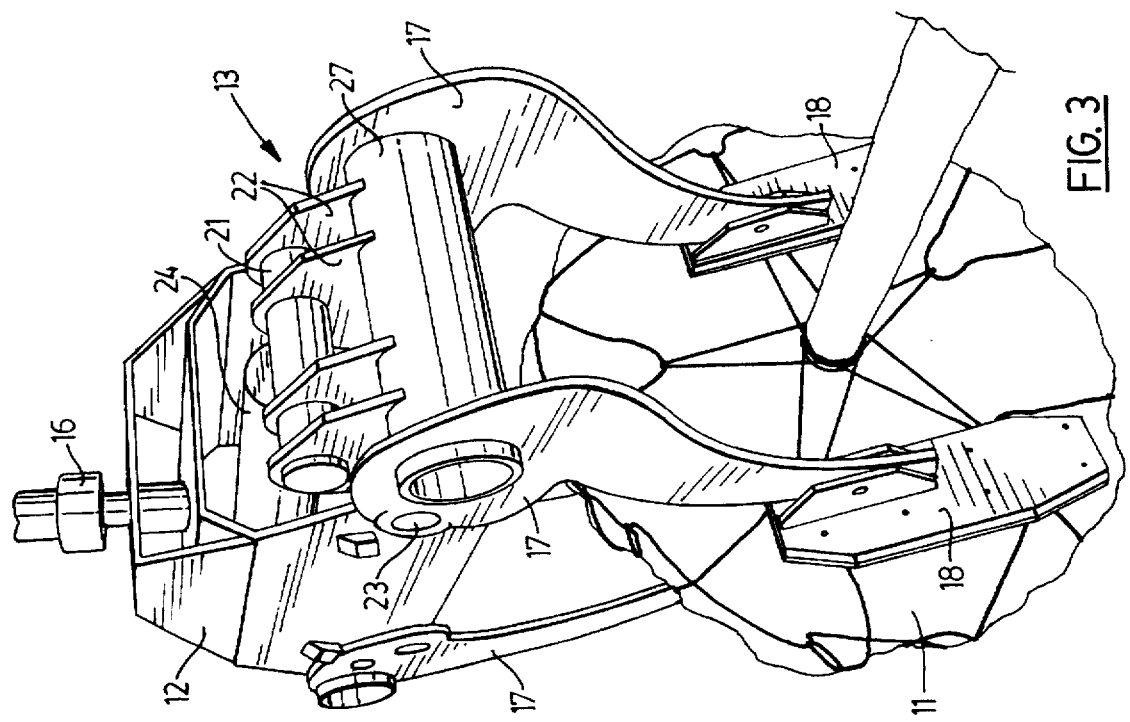
FIG. 3 is a front perspective view of the same apparatus.
Figure 2:
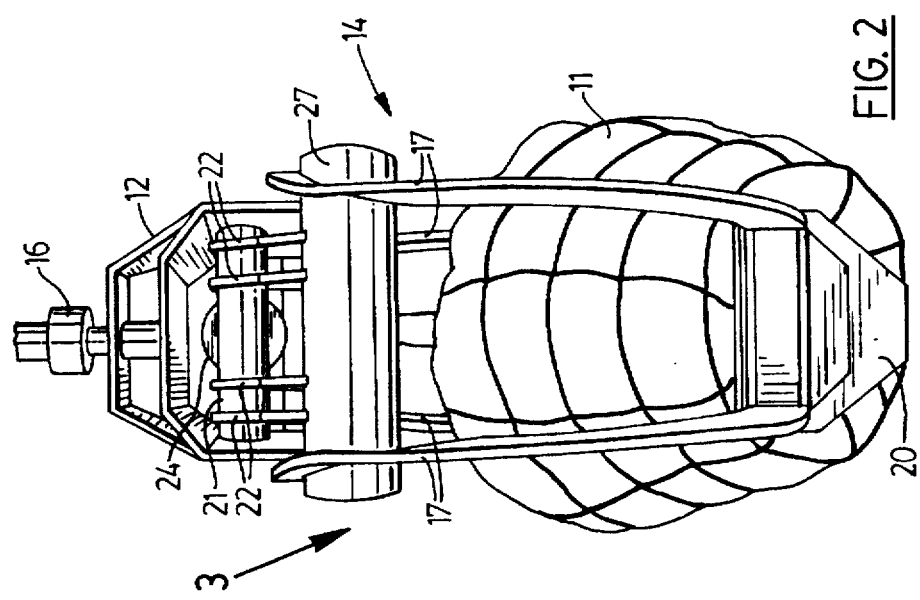
FIG. 2 is a rear view of the same apparatus.
Figure 4:
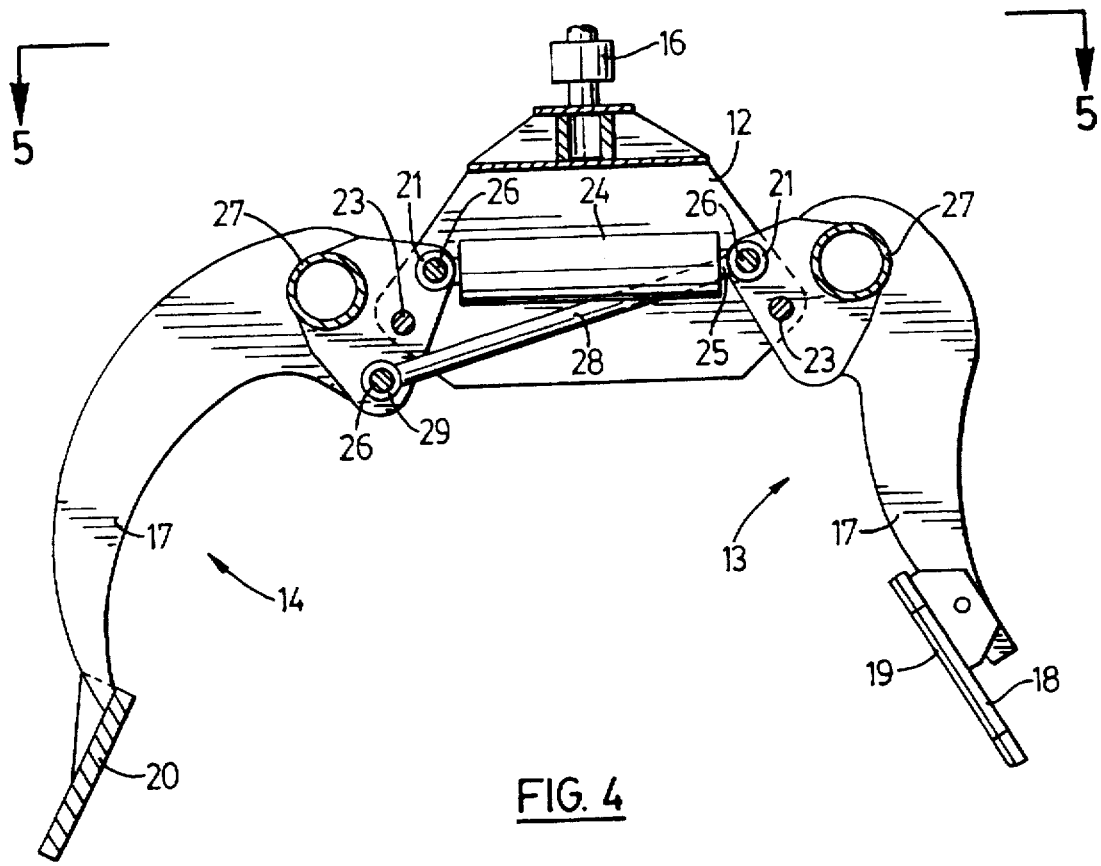
FIG. 4 is a cross-sectional side view of the same apparatus, shown without the tree.
Figure 5:
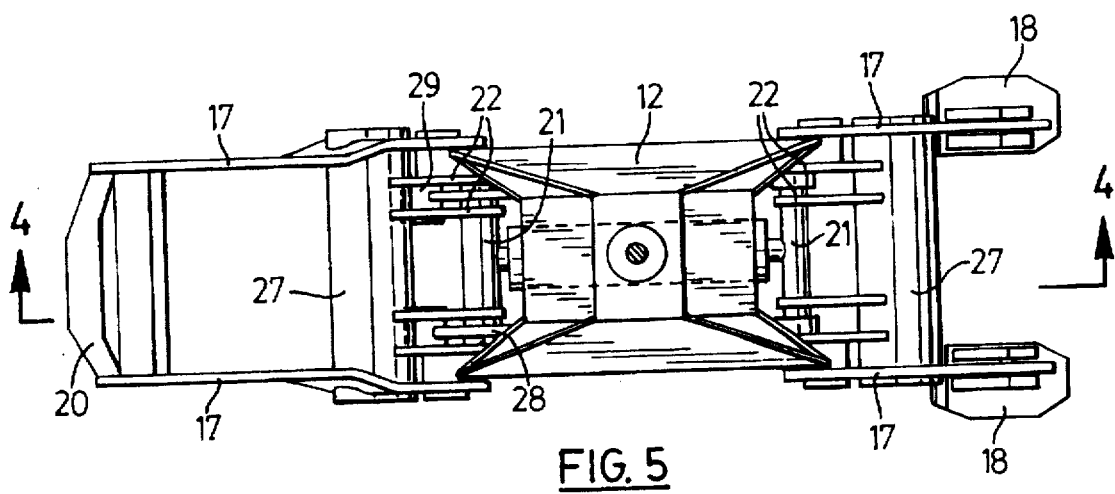
FIG. 5 is an aerial view of the same apparatus, again shown without the tree.

Referring to the drawings, the apparatus for lifting balled and burlapped trees is designated generally by reference numeral 10, and the trees are designated by reference numeral 11.

The lifting apparatus 10 comprises a yoke 12 to which are pivotally connected a front jaw assembly 13 and a rear jaw assembly 14. The yoke 12 is mounted to a hydraulic boom 15 by means of a continuous turn connection 16 that permits hydraulic lines (not shown) to be connected to a hydraulic cylinder 24 that activates the front and rear jaw assemblies 13, 14, permitting continuous turning of the apparatus 10 without winding up the hydraulic lines, as is known in the art.

Each of the front and rear jaw assemblies 13, 14 comprise a pair of arms 17. The arms 17 are curved, and oriented with their curves facing the same direction.

The arms 17 of the rear jaw assembly 14, which are greater in length than the arms 17 of the front jaw assembly, have a transverse plate 20 extending between them at their lower terminus, which is adapted to fit on the bottom of the earth ball of a tree 11.

The arms 17 of the front jaw assembly 13 each have a holding pad 18 that is hingedly connected proximal the lower terminus of the arm 17. The pads 18 each have a rubber shoe 19 mounted to their contact surfaces by means of threaded fasteners.

The upper portions of the two arms 17 in each of the front and rear jaw assemblies 13, 14 are connected together by cylindrical jaw support members 27, and are pivotally mounted to the sides of the yoke 12 by means of hinge pins 23. Brackets 22 extend from each of the jaw support members 27 to cylindrical hydraulic linkage supports 21. A hydraulic cylinder 24 and piston 25 extend between the supports 21 of the front and rear jaw assemblies 13, 14, and are connected thereto by means of connecting pins 26. Stabilizing rods 28 extend from the connecting pin 26 of the front jaw assembly 13 to rod support members 29 mounted to the brackets 22 of the rear jaw assembly 14, below the hinge pin 23.

Hose lines (not shown) connect between the upper and lower chambers of the hydraulic cylinder 24 to the continuous turn hydraulic connection 16, which connects with further hose lines that communicate fluidly with remote controls. The controls permit the front and rear jaw assemblies 13, 14 to be opened and closed by extending and retracting the hydraulic cylinder and piston 24, 25, thereby permitting the apparatus 10 to be used to grasp the earth ball of a tree 11.

The overall size of the yoke 12 and front and rear jaw assemblies 13, 14, and the hydraulic cylinder and piston 24, 25 enable the front and rear jaw assemblies 13, 14 to be opened and closed through a range of dimensions suitable for grabbing the earth ball of a balled and burlapped tree, with the blade 20 of the rear jaw assembly 14 fitting on the bottom of the earth ball and with the pads 18 of the front jaw assembly 13 fitting on the top of the earth ball, one such pad 18 on either side of the trunk of the tree 11. The rubber shoes 19 of the pads 18 are resiliently compressible to facilitate firm yet non-damaging grabbing of the earth ball between the front and rear jaw assemblies 13, 14.

The method and apparatus described above enable a single worker to be able to lift and reposition balled and burlapped trees for transport and storage. Moreover, since the jaws of the apparatus grab the earth ball of the tree at its top and bottom, the trees can be arranged side by side in rows, with the trees in each row being immediately adjacent to each other, the earth balls of adjacent trees virtually touching.

It will of course be appreciated that numerous alternatives and other embodiments are possible within the broad scope of the invention. For example, alternate control set ups for extending and retracting the hydraulic cylinder and piston could be substituted. In fact, other power driven mechanisms could be used for opening and closing the jaws of the apparatus, though hydraulic means is considered preferable. Different hinge connections and support arrangements could as well be substituted.

In its broadest scope, the present invention provides many modifications and alternative embodiments, appropriate for different circumstances.

We claim:

1. A grapple apparatus for lifting balled trees with a boom, said apparatus comprising:

a coupling having means for mounting said apparatus to such a boom;

front and rear jaw assemblies pivotally linked to said coupling;

actuating means connected to said jaw assemblies, to open and close said jaw assemblies through a range of dimensions less than and greater than the diameter of the earth ball of such a balled tree;

said front jaw assembly having two arms by which said front jaw assembly can hold the upper portion of such earth ball, with one of said arms on either side of the trunk of the tree;

each of said arms having a contact surface hinged freely thereto, remote from said coupling;

said rear jaw assembly having a transverse support, remote from said coupling, by which said rear jaw assembly can hold the lower portion of such earth ball;

said apparatus being asymmetric in profile, with said jaw assemblies being configured such that in use, with said apparatus mounted to such a boom in a generally horizontal orientation, a vertical plane through the centre of said mounting means parallel to said front and rear jaw assemblies is farther from said transverse support of said rear jaw assembly than from said contact surfaces of said front jaw assembly, whereby when said apparatus is used for lifting a balled tree, the centre of the earth ball of such a balled tree held by said for assemblies aligns vertically rearward of said mounting means.

2. The apparatus as claimed in claim 1 wherein the length of said rear jaw assembly from said coupling to said transverse support is greater than the length of said front jaw arms from said coupling to said contact surfaces.

3. The apparatus as claimed in claim 1 wherein wherein said front and said rear jaw assemblies are both curved such that each has a concave side and a convex side, and are oriented with the concave side of said rear jaw assembly facing the convex side of said front jaw assembly.

4. The apparatus as claimed in claim 1 wherein said mounting means is positioned proximal to the center of said coupling.

5. The apparatus as claimed in claim 1 wherein the size and shape of said arms of said front jaw assembly are similar.

6. The apparatus as claimed in claim 1 wherein said mounting means comprises means for rotating said coupling relative to said boom.

* * * * *